Feb. 21, 1967 B. S. WOLFE ETAL 3,305,791
FAULT DETECTING AND SWITCHING CIRCUIT FOR PROVIDING
RELIABILITY IN AMPLIFIER CIRCUITS
Filed March 9, 1964

Brian Sinclair Wolfe and
Malcolm Leslie Gilbert
INVENTORS

BY Wenderoth,
Lind & Ponack ATTORNEYS

United States Patent Office 3,305,791
Patented Feb. 21, 1967

3,305,791

FAULT DETECTING AND SWITCHING CIRCUIT FOR PROVIDING RELIABILITY IN AMPLIFIER CIRCUITS

Brian Sinclair Wolfe and Malcolm Leslie Gilbert, London, England, assignors to Elliott Brothers (London) Limited, London, England Filed Mar. 9, 1964, Ser. No. 350,314
Claims priority, application Great Britain, Mar. 7, 1963, 9,167/63
6 Claims. (Cl. 330—30)

This invention relates to the construction of electronic equipment and more particularly equipment of the kind in which, in order to increase the reliability, it is necessary to have components connected in such manner that the failure of one component does not necessarily put the equipment out of action.

According to the present invention, the improved equipment comprises two similar components arranged for connection alternatively in a signal circuit, circuit means coupled to one said component and operative on failure thereof to actuate switching means to connect the other said component into the circuit. Conveniently, the connection of the component into the signal circuit is effected by unidirectional conductive devices in circuit respectively with said components and selectively biased by said circuit means to effect the desired circuit connections.

The invention is particularly adapted for use in equipment wherein the components are amplifiers which use transistors and in such case means is provided for sensing changes in potential of the electrodes of a transistor following a failure thereof and for effecting the connection of a second transistor into the circuit.

The improved equipment of the present invention may also include means for signalling when a component, for example a transistor, has failed.

Figure 1:
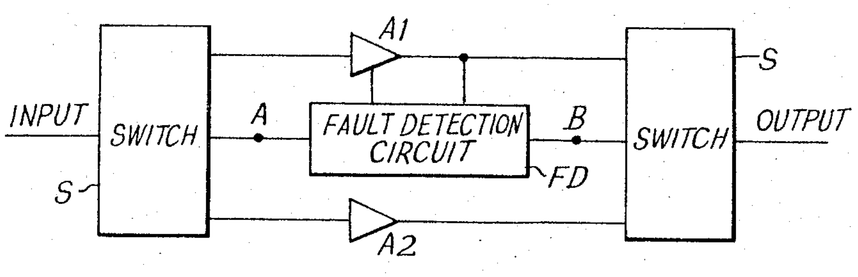
Figure 2:
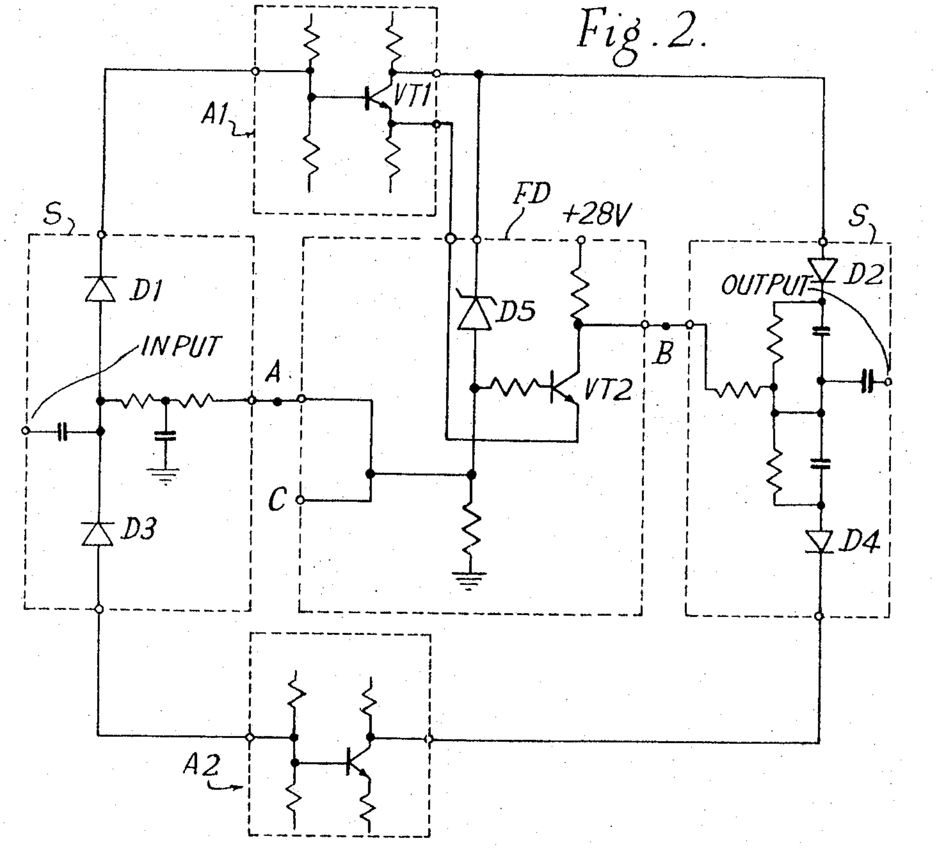

One form of equipment constructed in accordance with the present invention will now be described by way of example with reference to the accompanying drawing, in which:

FIGURE 1 is a block diagram illustrating an arrangement incorporating two amplifiers which may be used alternatively, and FIGURE 2 is a circuit diagram.

Referring to FIGURE 1, A1 and A2 represent two similar transistor amplifiers connected in parallel in such manner that if amplifier A1 fails, amplifier A2 automatically takes over, i.e., either amplifier A1 or A2 is connected into the signal path by means of the switches S.

Potentials available at terminals A and B for operating the switches S are derived from a fault detection circuit FD shown in FIGURE 2. When terminal A is made more positive with respect to VT1 base electrode voltage and terminal B is made more negative with respect to VT1 collector electrode voltage, diodes D1 and D2 conduct and amplifier A1 is switched in, whereas diodes D3 and D4 are non-conducting so amplifier A2 is switched out. When a fault occurs in amplifier A1, the fault detection circuit FD operates to reverse the potential of terminal A relative to VT1 base electrode voltage and of terminal B relative to VT1 collector electrode voltage, whereupon diodes D3 and D4 conduct and amplifier A2 is switched in. Amplifier A1 is simultaneously switched out by reverse biasing of diodes D1 and D2.

The fault detection circuit FD as shown in FIGURE 2 is arranged to respond to a fault in the transistor VT1 of amplifier A1 which causes the collector to short to the emitter. In order to detect such a fault, the collector and emitter potentials are monitored by the fault detection circuit which includes a Zener diode D5 and a transistor VT2.

In order to explain the operation of the circuit, consider the following example:

Suppose in normal operation the collector of transistor VT1 is at +15 v. and the emitter is at +2.6 v. and the base is at +3.1 v., and that Zener diode D5 breakdown voltage is 8 v. Then Zener diode D5 is conducting, causing terminal A to be at +7 v. The transistor VT2 also conducts causing terminal B to be at approximately 2.8 v., i.e., terminal A is positive with respect to VT1 base voltage and terminal B is negative with respect to VT1 collector terminal. Hence diodes D1 and D2 conduct. When the collector and emitter of transistor VT1 become short circuited due to a fault condition, both monitored potentials, i.e., collector and emitter potentials, change to approximately +4.2 v., thus cutting off diode D5 and transistor VT2.

Terminal A is now approximately zero volts, i.e. negative with respect to VT1 base voltage, and terminal B is at approximately +28 v., i.e., positive with respect to VT1 collector voltage, causing diodes D1 and D2 to cut off.

The change in potential at terminal C may be used to signal the failure of transistor VT1.

The A.C. input signal is connected to diodes D1 and D3 by a capacitor in order to block the D.C. biasing voltage from terminal A from appearing at the input terminal. The series resistors-shunt capacitor filter between terminal A and diodes D1 and D3 provides a D.C. path for the biasing voltage whilst preventing the A.C. input signal from appearing in the fault detection circuit, FD, where its presence could affect the performance of the circuit.

The output signal is connected via a capacitor to prevent the D.C. biasing voltage from terminal B from appearing at the output terminal. The parallel resistor-capacitor networks provide a D.C. path for the biasing voltage whilst maintaining a low signal output impedance by shunting the resistors with capacitors. The resistor connecting the networks to terminal B provides a D.C. path for the biasing voltage whilst maintaining a high impedance to ground of the signal output terminal.

We claim:

1. Electronic equipment comprising two similar components arranged for connection alternatively in a signal circuit, switching means in said signal circuit operable to effect said alternative connection, circuit means coupled to only one of said components and operative on failure thereof to actuate said switching means to connect the other said component into the circuit, said one component comprising a first transistor with base, emitter and collector electrodes and said circuit means comprising a second transistor and a Zener diode connected together in combination, which combination has two input terminals connected respectively to two electrodes of the first transistor, the Zener diode having one side connected to one of said input terminals and said circuit means further comprising a series resistor to which the other side of the Zener diode is connected and means connecting the junction of the Zener diode and the series resistor to one input electrode of the second transistor, means connecting the other input electrode of the second transistor to the other input terminal, breakdown conduction of the Zener diode being controlled by the potential difference between said two electrodes of the first transistor and in turn controlling the state of conduction of the second transistor, and output connections from said circuit means coupled to the switching means to control the switching means in response to the states of conductivity of the Zener diode and the second transistor.

2. Electronic equipment as claimed in claim 1, wherein said two electrodes of the first transistor are the emitter and the collector.

3. Electronic equipment as claimed in claim 1, wherein said one input electrode of the second transistor is the base thereof and said other input electrode is the emitter thereof, said circuit means further including a load resistor to which the collector of the second transistor is connected, said output connections being taken from the junction of the Zener diode with the series resistor and from the collector of the second transistor.

4. Electronic equipment as claimed in claim 1 wherein said switching means comprises diode switching networks having diodes connected so as to be biassed to an appropriate conduction state by the potentials appearing at said output connections.

5. Electronic equipment as claimed in claim 1 wherein said components are transistor amplifiers.

6. Electronic equipment as claimed in claim 1 wherein means are provided in said circuit means for producing a signal for indicating failure of said one component.

References Cited by the Examiner

UNITED STATES PATENTS

| | | | |
|---|---|---|---|
| 2,319,320 | 5/1943 | Hepp | 328—224 |
| 3,051,788 | 8/1962 | Seeley | 330—124 X |
| 3,116,477 | 12/1963 | Bradbury | 307—88.5 |
| 3,168,707 | 2/1965 | Levitt et al. | 307—88.5 |
| 3,176,240 | 3/1965 | Sante | 307—88.5 |
| 3,204,204 | 8/1965 | Buxton | 307—88.5 |

OTHER REFERENCES

Hall: "Basic Rules for Designing Reliability Into Semiconductor Circuits," Electronics, vol. 36, No. 15, Apr. 12, 1963.

ROY LAKE, *Primary Examiner.*

R. P. KANANEN, J. B. MULLINS, *Assistant Examiners.*